Figure 1:
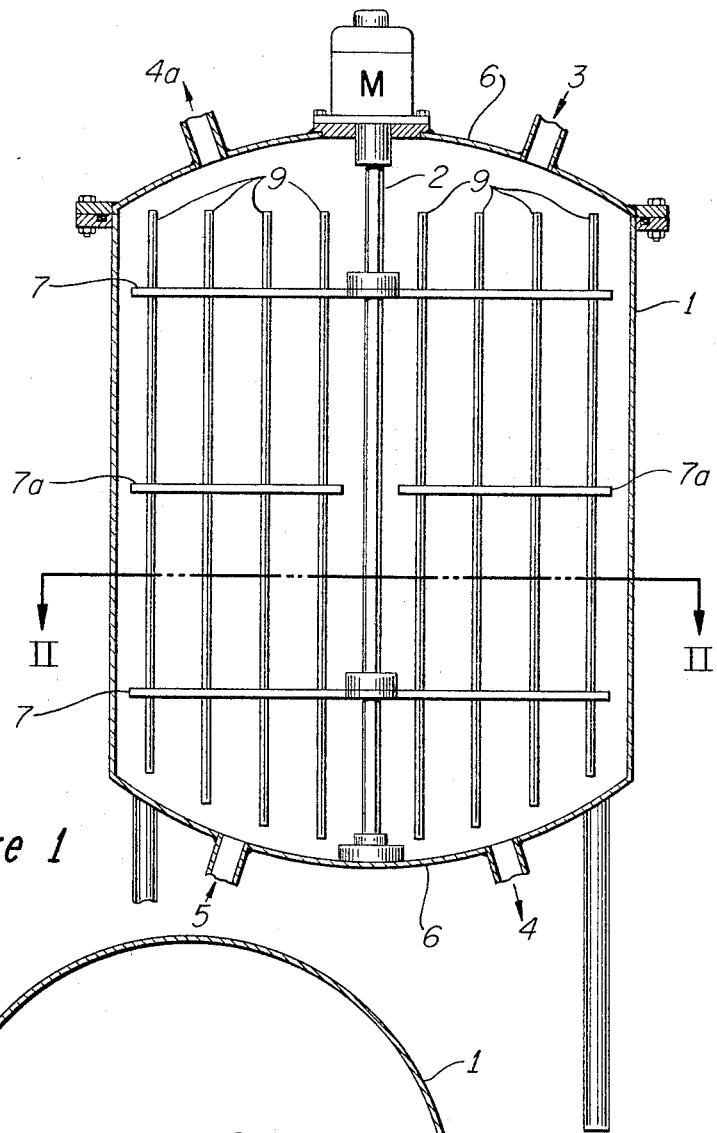

Aug. 9, 1966  R. STEEL  3,265,589
PROCESS FOR THE PROPAGATION AND FERMENTATION
OF FILAMENTOUS MICROORGANISMS
Filed Feb. 18, 1963  3 Sheets-Sheet 1

INVENTOR.
ROBERT STEEL
BY
EUGENE O. RETTER
GEORGE T. JOHANNESEN
ATTORNEYS

United States Patent Office 3,265,589
Patented August 9, 1966

3,265,589
PROCESS FOR THE PROPAGATION AND FERMENTATION OF FILAMENTOUS MICROORGANISMS
Robert Steel, Kalamazoo, Mich., assignor to The Upjohn Company, Kalamazoo, Mich., a corporation of Delaware
Filed Feb. 18, 1963, Ser. No. 258,985
13 Claims. (Cl. 195—80)

This invention relates to a process for the propagation and fermentation of filamentous microorganisms. More particularly, this invention comprises propagation and fermentation of filamentous microorganisms in a fermentor having a multiple-rod impeller which consists of an agitator shaft, a plurality of elongated rods and means for maintaining said rods spaced radially from the agitator shaft and parallel thereto.

Though considerable attention has been directed to various methods of mixing liquids, particularly the Newtonian fluids, it is only within the last decade that there has been some activity in the agitation or mixing of non-Newtonian fluids. The mixing problems encountered with Newtonian and non-Newtonian fluids are distinct and different from each other. Thus, it has become apparent to those in the art that the application of principles in one system is very seldom operative in the other system. For this reason, it is necessary that mixing devices be designed specifically for the problem system.

The non-Newtonian fluids of a filamentous fermentation process present problems not found in non-fermentation non-Newtonian fluids. For example, the mixing efficiency realized in a fermentation is reflected in better growth of the microorganism and higher yield of microbial product. An inefficient mixing can result in transferring an insufficient supply of oxygen or nutrients to the microorganism; this, then, adversely affects the growth of the organism which in turn further adversely affects the yield of the microbial product.

The fermentation industry concerned with the use of filamentous microorganisms has experimented widely with conventional and paddle type turbine impellers. These are agitating devices which are attached horizontally to the agitator shaft and which rotate in a plane perpendicular to the agitator shaft. The mixing accomplished by these impellers is augmented somewhat by the turbulence of gas which is sparged into the fermentor in order to maintain an aerobic environment. The art has shown that the oxygen solution rate which results from sparging the fermentation broth with gas (usually air but also oxygen mixtures or even pure oxygen may be used) and agitating by means of turbine impellers, increases with an increase in shearing action imposed on the fluid by the mixing impeller. However, with viscous non-Newtonian fluids the shearing forces are localized in the region about the turbine blade. These shearing forces are damped out at relatively short distances from the tips of the turbine blades. Thus, with turbine impellers, the shearing forces are not uniformly distributed throughout the fluid in the fermentor. This uneven distribution of shearing forces results in a less efficient fermentation process. The art has shown also that upon the increase of viscosity of the broth in a filamentous fermentation the impeller requires more power to maintain the same agitator speed. This, then becomes a limiting factor in fermentations where the mixing motors are not adequately sized to carry a heavier load. With this limitation it is then necessary that the fermentation be conducted within certain levels of viscosity. This limitation adversely affects the flexibility of the fermentation unit and thus limits the potential gain to be realized. In addition to this reduction of flexibility of the fermentation unit, there is also the higher cost problem encountered in providing more power to operate the mixing device as the fermentation broth becomes more viscous.

The present invention relates to a process utilizing a fermentor which has an agitator device which is particularly designed for mixing non-Newtonian fluids of a filamentous microorganism fermentation. This novel agitator device of the process increases mixing efficiency in highly viscous non-Newtonian fermentation broths. Furthermore, no extra power is necessary to keep this agitator device at a constant speed when the broth becomes more viscous. This then permits a greater flexibility of a fermentation unit while keeping power supply costs at a minimum.

Thus the present invention in its broadest aspects consists of a process for the propagation and fermentation of filamentous microorganisms in a fermentor having an agitator device which consists of an agitator shaft, horizontal support plates attached thereto, and rods passing through the horizontal support plates and running parallel to the agitator shaft.

The term "filamentous microorganisms" means those microorganisms which produce a group characterized by long interwoven threadlike hyphae. Such microorganisms are well recognized in the art. The actinomycetes and fungi are exemplary and include: (a) the Streptomyces which are important because, as described in U.S. Patent 2,649,401, for example, they are productive of oxidative enzyme systems useful in the oxidation of steroids, and as described in Waksman et al., Actinomycetes and their Antibiotics, 1953, (William and Wilkins, Baltimore), for example, they are productive of antibiotics such as actinomycetin, actinomycin, erythromycin, streptomycin, cycloheximide, tetracycline, oxytetracycline, chlorotetracycline, novobiocin, neomycin, and chloramphenicol; (b) the Penicillia which are important as producers of oxidative enzymes, for example, in U.S. Patent 2,762,747, and as producers of antibiotics notably penicillin by such species as *Penicillium notatum*, *Pencillium chrysogenum*, and the like; (c) the Aspergilli which are important as producers of oxidative enzymes as described in U.S. Patent 2,649,402 and metabolic products such as citric acid; and the (d) Mucorales including the genera Rhizopus, Cunninghamella, and Mucor of the families Mucoraceae and Choanephoraceae of the above order which are important as producers of oxidative enzyme systems and of metabolic products as described in U.S. Patent 2,602,769.

Figure 2:
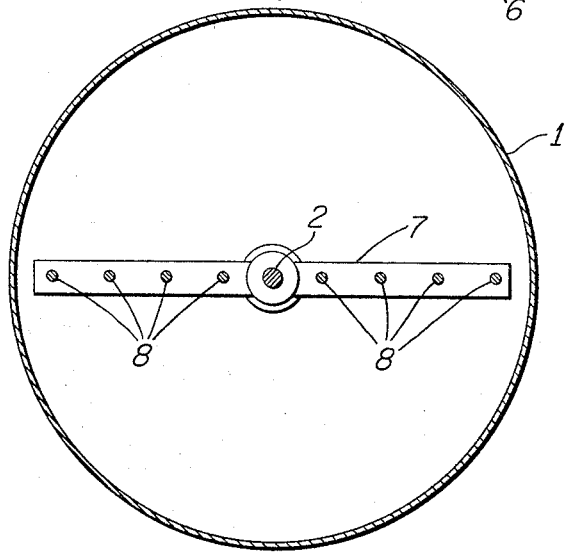
Figure 3:
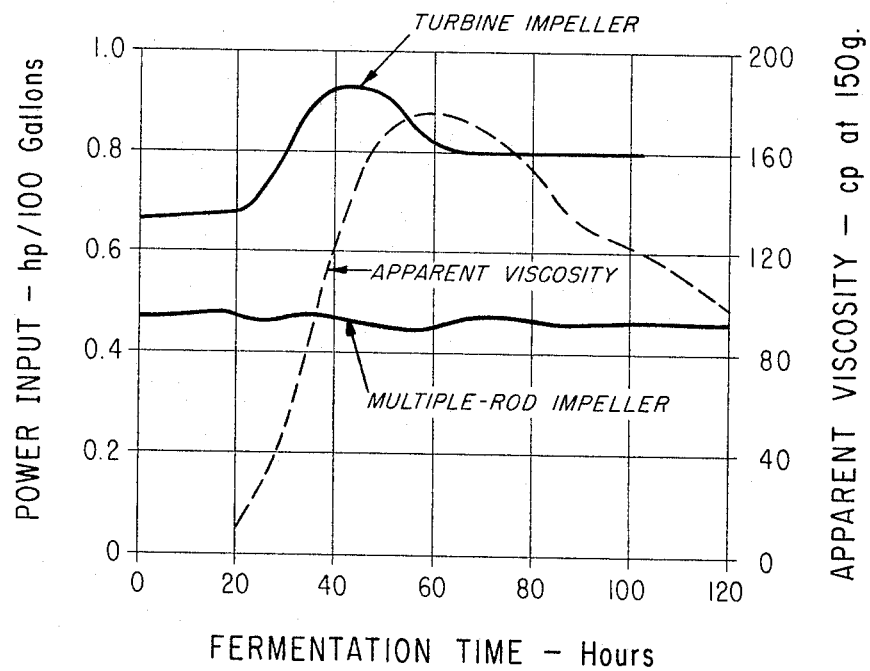
Figure 4:
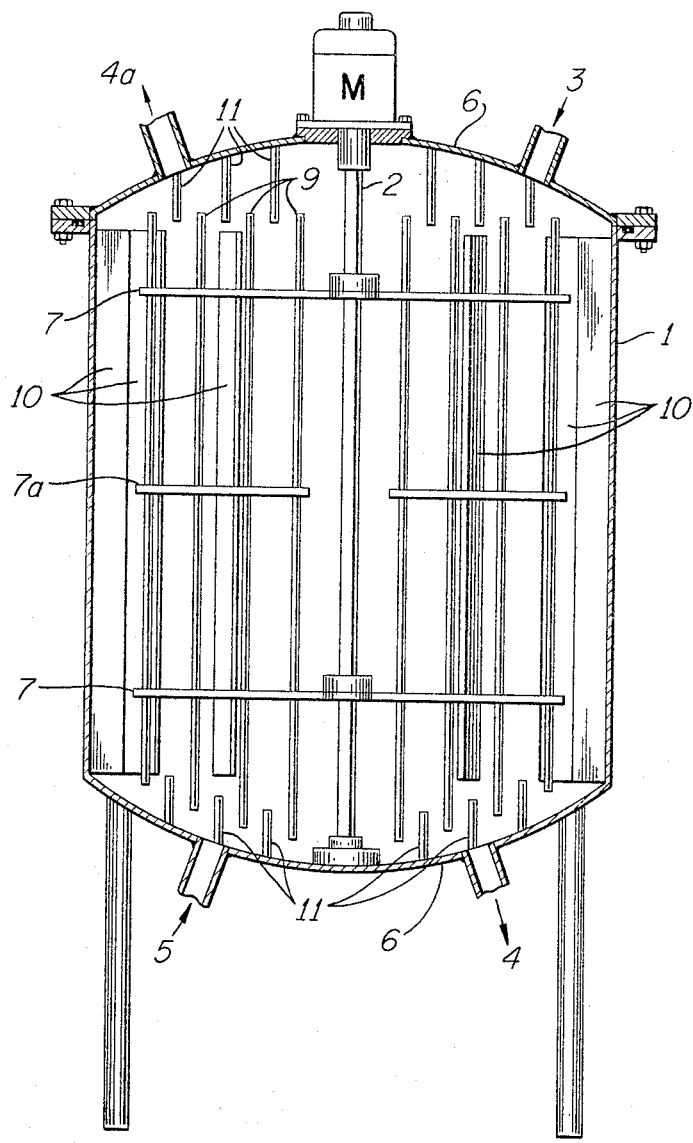

In the accompanying drawings:
FIGURE 1 is an elevation of the fermentor including an agitator device in accordance with my invention;
FIGURE 2 is a horizontal section along lines II—II of FIGURE 1;
FIGURE 3 is a curve showing the changes in power input for a turbine impeller and a multiple-rod impeller during a novobiocin fermentation.
FIGURE 4 is a modification of FIGURE 1 in that baffle plates are mounted on the inner wall of the fermentor and stationary rods are mounted on the inside top and bottom of the fermentor.

The process of the invention is carried out in apparatus such as that shown schematically in the accompanying drawings. In FIGURE 1 there is shown an apparatus which comprises a cylinder 1 having a circular cross-section and mounted with its longitudinal axis in a substantially vertical position, the axial length of said cylinder 1 advantageously being greater than the diameter thereof. The cylinder 1 is provided with end plates 6, each of said end plates 6 being adapted to support an axle 2 which is disposed along the axis of the cylinder 1. At intervals along the axle 2 and at right angles thereto there are mounted supporting plates 7. Said plates are preferably constructed of stainless steel having a thickness of from about ¼ to ½″. The thickness should be sufficient to withstand stresses and strains encountered in the particular size of fermentor. For example, in a fermentor of 4000 U.S. gallons of operating volume, plates ⅜″ thick are satisfactory. These support plates 7 impart radially moving shearing forces which supplement the annularly moving shearing forces of the rods 9, hereinafter described. If desired, additional shear plates 7a, having the same characteristics as supporting plates 7 except that they are not mounted on the axle 2, can be positioned at intervals to provide further radially moving shearing forces. Suitable shear plates 7a are illustrated in FIGURE 1 of the drawing. At intervals along the supporting plates 7 and shear plates 7a there are located a plurality of holes 8, each being the same in diameter of approximately 1 to 2″, and each being positioned in the same relationship to each other on the supporting plates 7 and shear plates 7a. It is to be understood that the number of holes 8 can be increased or decreased as desired and is in no way limited to the 8 shown for purposes of illustration in FIGURE 2. Advantageously, the holes 8 should be about 3 to 6″ apart from center to center in order to realize the desired shearing action in a standard fermentor. Stainless steel rods 9 are then passed through said holes 8 in the supporting plates 7 and shear plates 7a. The diameter of the rods is determined by the the diameter of the holes 8 in the supporting plates 7 and shear plates 7a and the length of the rods is such that they pass through the supporting plates 7. The overall length of the rods 9 is such that there is sufficient clearance between the rods, the walls of the cylinder 1, and other internal structures of the fermentor. They should extend substantially the functional length of the fermentor. The rods 9 passing through the supporting plates 7 and shear plates 7a can be rotated at varying speeds and when rotated provide the aforementioned shearing force at a plurality of positions in the fermentor. The axle 2 is coupled at one end to a motor M. The cylinder 1 is provided with an inlet 3 for introduction of nutrient medium, and outlets 4 for withdrawal of fermentation liquor and 4a for exhausting waste gases, and 1 or more inlets 5 for sterile air; each of the inlets 3, 4 and 5 being provided with valves, metering devices, etc. (not shown). The air which is to be introduced through the inlets 5 is sterilized using conventional procedures such as a steam treatment and passage through filters, etc.

We have found that by carrying out the process of the invention using the type of apparatus illustrated in FIGURE 1, it is possible to maintain effective agitation and aeration in the fermentation liquor throughout the fermentation cycle without requiring added power as the liquor becomes more viscous. This is accomplished by the agitator device which imparts the novel type of shearing action or force throughout the fermentor. Thus, the limitations found with turbine type impellers are obviated by the process of the present invention.

The term "shearing force" is employed throughout this specification to designate the type of force applied to the fermentation liquor by the rotation of the rods 9 in the above-described fermentor. This type of agitation produced in this manner is novel and is distinguished from that which is normally employed in conventional fermentors. Thus, in a conventional tank fermentor the agitation is provided by the rotation of a turbine type agitator. The operation of such an agitator produces a high degree of agitation at very localized points in the fermentaion liquor and at such points the oxygen uptake by the liquor is greatly facilitated. However, in the bulk of the fermentation the agitation is of a low order insufficient to produce efficient oxygen uptake. In contrast, the method of agitation in the process described above produces a high degree of agitation through substantially the whole of the fermentation liquor. Each of the multiplicity of rods imparts a shearing force to the liquid through which it is passing. The shearing action of the rod in the liquid greatly facilitates the uptake of oxygen by the liquid by breaking down both the mycelial clumps and the air into fine particles. Thus, the operation of the rotating rods provides a higher degree of agitation and a high rate of oxygen transfer at a multiplicity of points throughout the fermentation liquor in contrast to the localized agitation produced by turbine type agitators. As shown by the curve in FIGURE 3, the power drawn by the multiple-rod impeller is less than that of the turbine impeller throughout the fermentation. Further, the power requirement for a multiple-rod impeller remains substantially uniform throughout the fermentation cycle in contrast to the higher power requirements of the turbine impeller as the fermentation liquor becomes more viscous.

In a modification of the fermentor shown in FIGURE 1, stationary rods 11, as shown in FIGURE 4, can be mounted on the inside top and bottom of the fermentor in a manner such that they project between each pair of rods 9 to provide additional shearing action on the fluid. The distance that the stationary rods 11 can project will be limited by the supporting plates 7. The stationary rods 11, as shown in FIGURE 4, are mounted both at top and bottom inside the fermentor. If it is inconvenient in regards to the overall operation of the fermentor to include the top mounted stationary rods 11, then these can be dispensed with.

It is to be noted that, while the novel means of agitation described above has been described with respect to its use in an elongated cylindrical fermentor with its longitudinal axis mounted vertically, said novel means can also be applied to the agitation of liquids in an elongated cylindrical fermentor with its longitudinal axis mounted horizontally. For this purpose the multiplicity of rods are mounted on an agitator shaft in substantially the same manner as described above. The rods are so arranged that by rotation thereof each of the multiplicity of rods imparts the shearing force through the liquid through which it is passing. Further, each rod is constantly leaving the surface of the fermentation liquor. Thus, the surface of the liquor is constantly shattered by the re-entry of a rod. The shearing action of the rod in the liquid plus the constant shattering of the liquid surface greatly facilitates the uptake of oxygen by the liquid by breaking down both the mycelial clumps and the air into fine particles.

In a preferred modification of the type of apparatus shown in FIGURE 1 the agitation and aeration of the fermentation liquid is improved still further by mounting one or more baffle plates 10 longitudinally on the inner wall of the cylinder 1 so that said baffles are above the surface of the fermentation liquor. The baffle or baffles preferably take the form of strips of non-corrosive material such as stainless steel which project from the side of the vessel towards the central axis. The width of each strip is less than the clearance between the tip of the supporting plates 7 and the side of the cylinder 1 and is preferably of the order of slightly less than ¾ the distance of the clearance (10–20% of the fermentor diameter). The shape and manner of mounting these baffles is illustrated by FIGURE 4 which shows typical baffles 10 in position in a fermentation vessel of the type shown in FIGURE 1.

While the process of the invention is illustrated in the following example by its application to the propagation of microorganisms which produce antibiotics, it is to be understood that the process is not limted to such applications and can be used in the propagation of a wide variety of microorganisms such as those set forth above. Where the process of the invention is employed in the propagation of antibiotic-producing microorganisms the effluent from the fermentor can be processed on a continuous or semi-continuous basis, using conventional procedures such as filtration, solvent extraction, adsorption, and the like, to recover the antibiotic.

The following example is illustrative of the process of the present invention but is not to be construed as limiting.

*Example 1*

A fermentation in which novobiocin was produced by the propagation of *Streptomyces niveus* NRRL 2466 was carried out using the following procedure. A soil stock of *Streptomyces niveus* NRRL 2466, was used to inoculate three 500 ml. Erlenmeyer flasks each containing 250 ml. of seed medium I consisting of the following ingredients:

| | Grams |
|---|---|
| Dried Torula yeast | 15 |
| Glucose monohydrate | 10 |
| N-Z amine Type B | 2 |
| Tap water, q.s. to make 1 liter. | |

The seed medium presterilization pH was 6.3. The seed was grown for 3 days at 28° C. on a reciprocating shaker operating at 92 strokes per minute.

The three shake flasks, described above (750 ml.), were used to inoculate a 500 gal. seed tank containing 200 gal. of the sterile seed medium I described above.

The presterilization pH of the seed tank medium was 6.3. The seed tank was grown for 3 days at a temperature of 28° C., aeration rate of 11 cu. ft. per min., and agitated at a rate of 185 r.p.m.

The seed tank, described above, was then used to inoculate a 5000 gal. fermentor containing 3800 gal. of the following sterile medium:

| | G./l. |
|---|---|
| Distiller's solubles | 40 |
| Glucose monohydrate | 40 |
| Tap water | Balance |

The presterilization pH was adjusted to 8.0 with a 50% sodium hydroxide solution. The post-sterilization pH was 6.5. The fermentation temperature was maintained at 30° C., and the airflow rate was 200 cu. ft. per min.

The above fermentation procedure was repeated for each impeller change as is noted in the following table.

| Impeller Type | Air Flow Rate, cubic feet per minute, measured at 1 atm. and 70° F. | | | | Calculated Oxygen Solution Rate for 1.0 H.p./100 gal. at Air Rate 100 c.f.m. |
|---|---|---|---|---|---|
| | 50 | | 100 | | |
| | Oxygen Solution Rate, mM/l hr. | Agitator Power, H.p./100 Gal. | Oxygen Solution Rate, mM/l hr. | Agitator Power, H.p./100 Gal. | |
| 1. Turbine D/T¹=0.28, agitator speed, 164 r.p.m. | 11.1 | 0.86 | 13.3 | 0.81 | (16.4) |
| 2. Turbine D/T=0.33, agitator speed, 124 r.p.m. | 13.2 | 1.00 | 16.6 | 0.93 | (17.8) |
| 3. Turbine D/T=0.43, agitator speed, 82 r.p.m. | 12.6 | 0.92 | 17.0 | 0.86 | (19.8) |
| 4. Multiple-rod impeller, agitator speed 82 r.p.m., expanded metal baffles | 11.9 | 0.52 | 14.6 | 0.45 | (32.4) |
| 5. Same as 4 | 11.2 | 0.53 | 16.0 | 0.46 | (34.8) |
| 6. Same as 4 | 11.1 | 0.53 | 14.6 | 0.47 | (31.0) |

¹ D is impeller diameter and T is tank diameter; each turbine impeller consisted of our blades attached to a disc.

I claim:

1. In a process for the propagation of filamentous microorganisms which comprises propagating said microorganisms under aerobic conditions in an elongated cylindrical fermentor the improvement which comprises, agitating the fermentation liquor by subjecting same to a shearing force at each of a plurality of positions in the fermentor, said shearing force being applied by a multiple-rod impeller, the rods of which are disposed parallel to the longitudinal axis of said fermentor.

2. In a process for the propagation of filamentous microorganisms which comprises propagating said microorganisms under aerobic conditions in an elongated cylindrical fermentor the improvement which comprises, agitating the fermentation liquor by subjecting same to an annularly moving shearing force at each of a plurality of radially spaced positions in the fermentor, each said shearing force extending substantially the functional length of said fermentor thereof, said shearing force being applied by a multiple-rod impeller, the rods of which are disposed parallel to the longitudinal axis of said fermentor.

3. In a process for the propagation of filamentous microorganisms which comprises propagating said microorganisms under aerobic conditions in an elongated cylindrical fermentor with its longitudinal axis substantially in a vertical position the improvement which comprises, agitating the fermentation liquor by subjecting same to an annularly moving shearing force at each of a plurality of radially spaced positions in the fermentor, each said shearing force extending substantially the functional length of said fermentor thereof, said shearing force being applied by a multiple-rod impeller, the rods of which are disposed parallel to the longitudinal axis of said fermentor.

4. A process according to claim 2 wherein the annularly moving shearing force is supplemented by radially moving shearing force.

5. In a process for the propagation of *Streptomyces niveus* NRRL 2466 which comprises propagating said microorganism under aerobic conditions in an elongated cylindrical fermentor with its longitudinal axis substantially in a vertical position the improvement which comprises, agitating the fermentation liquor by subjecting same to an annularly moving shearing force at each of a plurality of radially spaced positions in the fermentor, each said shearing force extending substantially the functional length of said fermentor thereof, said shearing force being applied by a multiple-rod impeller, the rods of which are disposed parallel to the longitudinal axis of said fermentor.

6. A process according to claim 1 wherein baffle plates are mounted longitudinally on the inner wall of the elongated cylindrical fermentor.

7. A process according to claim 1 wherein stationary rods are mounted on the inside top and bottom of the fermentor in a manner such that they project between each pair of rods of the multiple-rod impeller.

8. A process for the propagation of filamentous microorganisms which comprises propagating said microorganisms under aerobic conditions in an elongated cylindrical fermentor, agitating the fermentation liquor by subjecting the same to a shearing force at each of a plurality of positions in the fermentor disposed parallel to the longitudinal axis of said fermentor.

9. A process for the propagation of filamentous microorganisms which comprises propagating said microorganisms under aerobic conditions in an elongated cylindrical fermentor, agitating the fermentation liquor by subjecting the same to an annularly moving shearing force at each of a plurality of radially spaced positions in the fermentor, each said shearing force extending substantially the functional length of said fermentor thereof.

10. A process for the propagation of filamentous microorganisms which comprises propagating said microorganisms under aerobic conditions in an elongated cylindrical fermentor with its longitudinal axis substantially in a vertical position, agitating the fermentation liquor by subjecting the same to an annularly moving shearing force at each of a plurality of radially spaced positions in the fermentor, each said shearing force extending substantially the functional length of said fermentor thereof.

11. A process according to claim 9 wherein the annularly moving shearing force is supplemented by radially moving shearing force.

12. A process for the propagation of *Streptomyces niveus*, NRRL 2466, which comprises propagating said microorganism under aerobic conditions in an elongated cylindrical fermentor with its longitudinal axis substantially in a vertical position, agitating the fermentation liquor by subjecting the same to an annularly moving shearing force at each of a plurality of radially spaced positions in the fermentor, each said shearing force extending substantially the functional length of said fermentor thereof.

13. A process according to claim 8 wherein vortexes in the fermentation liquor are inhibited.

References Cited by the Examiner

UNITED STATES PATENTS

| | | | |
|---|---|---|---|
| 318,307 | 5/1885 | Schuman | 195—138 |
| 338,579 | 3/1886 | Andersen et al. | 195—138 |
| 645,835 | 3/1900 | Schmitz | 195—143 |
| 2,474,833 | 7/1949 | Eweson | 71—9 |
| 2,731,331 | 1/1956 | Strezynski | 195—135 |
| 3,028,314 | 4/1962 | Means et al. | 195—127 |

A. LOUIS MONACELL, *Primary Examiner.*

D. M. STEPHENS, *Assistant Examiner.*